(12) United States Patent
Devaux et al.

(10) Patent No.: US 6,357,005 B1
(45) Date of Patent: *Mar. 12, 2002

(54) SYSTEM FOR THE SECURE CD-ROM STORAGE OF DATA

(75) Inventors: François Devaux, L'Haü-les-Roses; Jean-Claude Huot, Viroflay, both of (FR)

(73) Assignee: Oberthur Card Systems SA, Paris (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/147,577
(22) PCT Filed: Jul. 22, 1997
(86) PCT No.: PCT/FR97/01362
  § 371 Date: Jan. 26, 1999
  § 102(e) Date: Jan. 26, 1999
(87) PCT Pub. No.: WO98/04966
  PCT Pub. Date: Feb. 5, 1998

(30) Foreign Application Priority Data

Jul. 26, 1996 (FR) .............................................. 96 09443

(51) Int. Cl.⁷ ................................................. H04L 9/14
(52) U.S. Cl. .......................... 713/172; 713/193; 705/51; 380/283
(58) Field of Search .................................. 713/172, 182, 713/183, 185, 193, 200, 168; 705/57, 51; 380/277, 278, 283, 284, 285

(56) References Cited

U.S. PATENT DOCUMENTS 4,960,982 A  * 10/1990 Takahira .................. 713/193 X
5,267,311 A  * 11/1993 Bakhoum .................... 705/60
5,786,587 A  *  7/1998 Colgate, Jr. ................. 235/487

* cited by examiner

Primary Examiner—Gilberto Barrón, Jr.
(74) Attorney, Agent, or Firm—Oblon, Spivak, McClelland, Maier & Neustadt, P.C.

(57) ABSTRACT

A system for securely storing CD-ROM data including a CD-ROM having data encrypted at least in part with a cryptographic algorithm having a decryption key K, a CD-ROM drive for receiving the CD-ROM, an electronic decryption microcircuit embedded in the CD-ROM, means for exchanging information between the CD-ROM drive and the electronic decryption microcircuit embedded in the CD-ROM, and a chip card containing at least a part $K_1$ of the decryption key K, any remaining part $K_2$ of the decryption key K being in the electronic decryption microcircuit embedded in the CD-ROM. Also included is a secure means for securely exchanging information between the chip card and the electronic microcircuit embedded in the CD-ROM. Further, the electronic decryption microcircuit embedded in the CD-ROM includes an antenna which provides, without the presence of contact, both an electrical power supply to the decryption microcircuit from an external source and exchanges of information with the external source.

14 Claims, 1 Drawing Sheet

SYSTEM FOR THE SECURE CD-ROM STORAGE OF DATA

BACKGROUND OF THE INVENTION

1. Field of the Invention

The present invention relates to the protection of the confidentiality of data stored on a CD-ROM.

2. Discussion of the Background

The only possibility for safeguarding the confidentiality of data stored on a CD-ROM is encryption. However, this protection is not actually satisfactory other than to the extent that the decryption key remains inaccessible from the user, this not being the case when the decryption key is stored on the CD-ROM or provided to the user in some other way. Moreover, there is often a considerable risk of the decryption key being pirated at the level of the electronic decryption circuit itself, whether it be located in the CD-ROM drive or downstream.

Various attempts have already been made to solve this problem.

In the case of cassettes or magnetic diskettes which are contained in an irremovable casing, it is known practice, through international patent application WO-A-89/12890, to equip the casing with an electronic chip provided with electrical contacts. The data are coded on the recording medium, whether this be a cassette or a magnetic diskette, and decoded by way of the electronic chip with which the casing is equipped. This kind of protection cannot be used with a CD-ROM since the latter is not presented in an irremovable casing. Furthermore, it is not entirely safe since the decoding key must be known to an authorized user who may at leisure allow other, even unauthorized, users who possess the appropriate drive to avail themselves of this key.

In the CD-ROM case, it is known practice, through German patent application DE-A-43 07 395, to code the data recorded on the CD-ROM with the aid of a key or password and to store the password in a chip card. This makes it possible, a priori, to preclude the use of the data from the CD-ROM by users who are not in possession of the chip card. However, there is still a risk of pirating because the password is not actually made secure inside the CD-ROM drive or the CD-ROM itself.

SUMMARY OF THE INVENTION

The purpose of the present invention is to remedy these various drawbacks and to ensure effective protection of the confidentiality of data stored on a CD-ROM.

Its subject is a system for the secure CD-ROM storage of data comprising a CD-ROM on which are stored data encrypted at least in part with a cryptographic algorithm having a decryption key K and a CD-ROM drive. This system for the secure storage of data is noteworthy in that it furthermore comprises:

- an electronic decryption microcircuit embedded in the said CD-ROM,
- means of exchanging information between the CD-ROM drive and the electronic decryption microcircuit embedded in the CD-ROM,
- a chip card containing at least a part $K_1$ of the decryption key K, any remaining part $K_2$ of the decryption key K figuring in the electronic decryption microcircuit embedded in the CD-ROM and,
- secure means of exchanging information between the chip card and the electronic microcircuit embedded in the CD-ROM.

By virtue of this system, the confidentiality of the data stored on CD-ROM is ensured by means of encryption, the decryption key of which is never accessible to the user in unenciphered form, thus to a large extent reducing the risks of fraud.

The electronic decryption microcircuit embedded in the CD-ROM is advantageously provided with an inductive or capacitive antenna making it possible to cater from outside the CD-ROM, in the absence of any contact, both for its electrical power supply and for information exchanges.

The CD-ROM drive is advantageously provided with a chip card connector and with an electronic circuit which caters, apart from for the reading of the CD-ROM, for the management of the links for exchanging information between itself, the electronic microcircuit embedded in the CD-ROM and the chip card.

The chip card is advantageously provided with a code for identifying its owner which must necessarily be delivered to him/her at the start of a session in order for the card to agree to communicate with the outside, whilst the CD-ROM drive is equipped with means for monitoring the uninterrupted presence of a chip card in its chip card connector throughout a decryption performed by the electronic microcircuit embedded in the CD-ROM.

BRIEF DESCRIPTION OF THE DRAWINGS

Other characteristics and advantages of the invention will emerge from the description below of an embodiment of the invention, given by way of example. This description will be given in conjunction with FIG. 1 which illustrates, diagrammatically, the architecture of the system for the secure CD-ROM storage of data according to the invention.

DESCRIPTION OF THE PREFERRED EMBODIMENT

Figure 1:
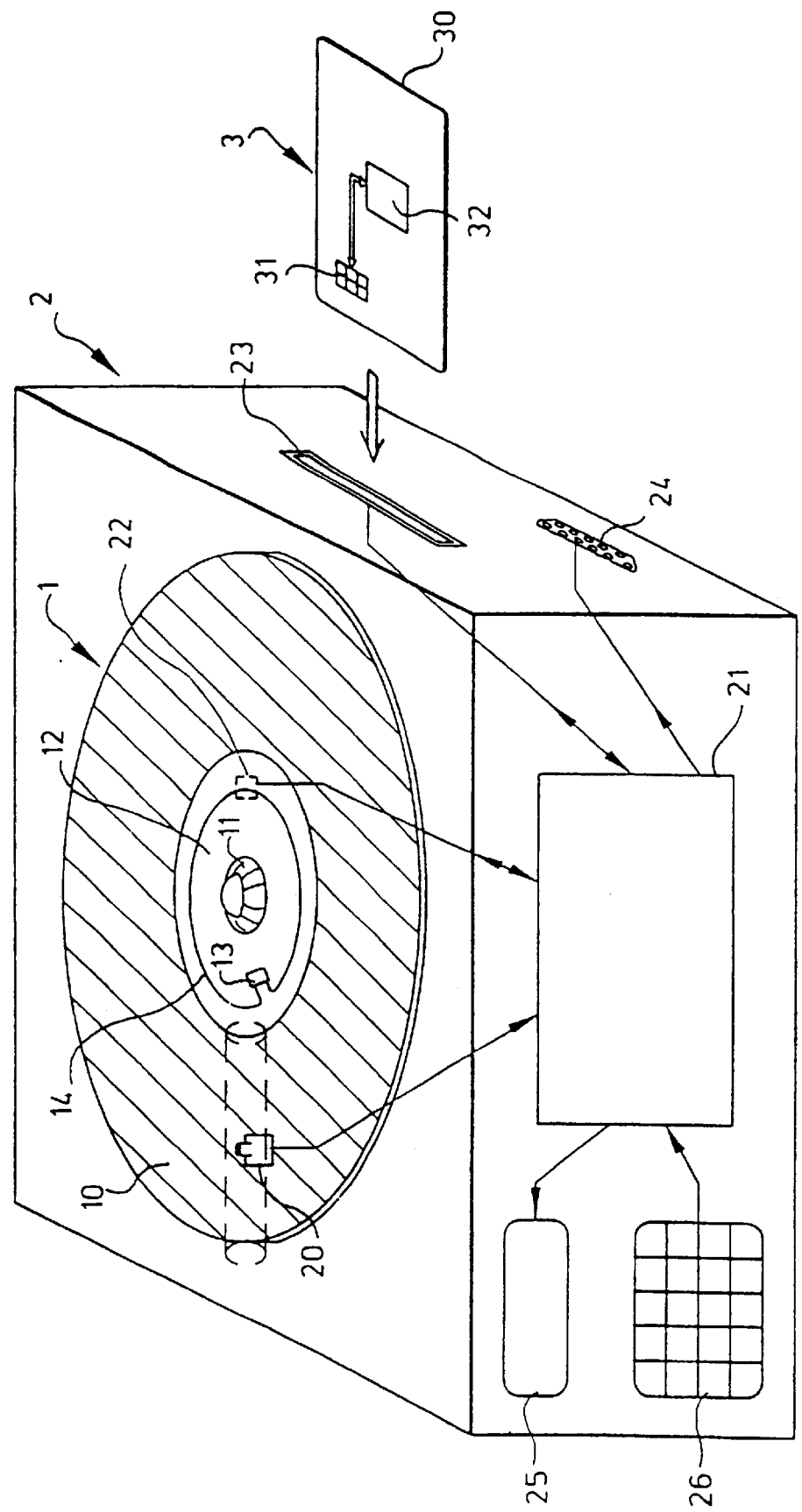

Other characteristics and advantages of the invention will emerge from the description below of an embodiment of the invention, given by way of example. This description will be given in conjunction with the drawing in which the single FIGURE illustrates, diagrammatically, the architecture of the system for the secure CD-ROM storage of data according to the invention.

The CD-ROM 1 has, like any conventional CD-ROM, an etched annular region 10 in which the data are stored, a centering hole 11 and, around this centering hole 11, a central region 12 allowing it to be gripped and spun round by the mechanism of a CD-ROM drive. It differs from conventional CD-ROMs by the fact that the data which it stores are encrypted by an algorithm with a key K and which therefore cannot be utilized directly, and that it has an electronic decryption microcircuit 13 with an inductive antenna 14 which are embedded in the plastic of its central region 12. The electronic decryption microcircuit 13 and its inductive antenna 14 come, through their design, under the art of contactless chip cards. The antenna 14, which could also be capacitive, allows both the electrical supplying of power to the electronic decryption microcircuit 13 and exchanges of information with this electronic decryption microcircuit 13 from outside the CD-ROM. The electronic decryption microcircuit 13 comprises a microcontroller provided with a serial input/output linked to the antenna 14 and with a RAM type random access and a ROM type read only and possibly EEPROM memories. It is programmed to demand the decryption key K or that part which it lacks $K_1$ of this key as soon as it is switched on, to receive it in a secure form, to place it in RAM memory, to receive the encrypted data, to decrypt them with the encryption key K obtained stored in RAM memory and to return the decrypted data so that they can be utilized. It will not be described in detail since it comes within standard practice for a data encryption and decryption technician.

The CD-ROM drive 2 comprises the standard elements of a CD-ROM drive, including the motor for spinning the CD-ROM being read, the optical read head 20 with laser diode and photodetector, mounted on a mobile rig moving along a radius of the CD-ROM being read and an electronic circuit 21 catering for the management of the movements of the mobile rig of its read head 20 and a shaping of the signals emanating from this read head. In addition to these elements, it is provided with a sensor 22 co-operating with the antenna 14 of the electronic decryption circuit 13 embedded in the CD-ROM 1, a chip card connector 23, a connector for outside communication 24, a display 25 and a keypad 26. Its electronic circuit 21 caters for, in addition to the standard tasks of reading a CD-ROM:

management of the sensor 22 co-operating with the antenna 14 of the electronic decryption circuit 13 embedded in the CD-ROM 1 so as to cater for the power supply and exchanges of information with this latter decryption circuit 13, management of the chip card connector 23 in such a way as to cater for the power supply for a linked chip card 3 and the exchanges of information with the latter, management of the connector for outside communication 24 so as to deliver, to a remote processing system, utilizable data read from the CD-ROM 1 and decrypted by the electronic decryption microcircuit 13 embedded in the CD-ROM 1, with the aid of a decryption key provided by the chip card 3, management of the display 25, and management of the keypad 26.

The chip card 3 comprises a plastic-coated support card 30 provided with a set of contacts 31 linked to an electronic microcircuit 32 which is represented, for ease, in the middle of the card but which is in reality buried under the contacts 31. The microcircuit 32 contains mainly, a microcontroller (CPU) linking with a serial input/output port (SIO) joined to the contacts 31 and with memory which is partly random access (RAM) and partly permanent, of the non-rewritable read only type (ROM) and also of the rewritable read only type (EEPROM), which is intended for storing a part at least $K_1$ of the decryption key and a program which manages the protocol for communication in a secure form of that part $K_1$ of the encryption key residing in the chip card 3.

On commencing the reading of data encrypted on the CD-ROM 1, the CD-ROM drive 2 powers the electronic decryption microcircuit 13 embedded in the CD-ROM 1 which then requests the encryption key K or its missing part $K_1$. In response, the CD-ROM drive 2 places the electronic decryption microcircuit 13 embedded in the CD-ROM 1 in communication with the chip card 3. The latter demands an identification code from the operator before agreeing to a dialogue. If its demand is satisfied positively by the operator who types his identification code into the keypad 26, the chip card 3 defers to the request from the electronic decryption microcircuit 13 embedded in the CD-ROM 1 and sends it, in secure form, the encryption key K or its missing part $K_1$. The electronic decryption microcircuit 13 embedded in the CD-ROM 1 then places the complete encryption key K in its random access memory and informs the CD-ROM drive 2 that it is near [sic] on decryption. The CD-ROM drive 2 then establishes an upward and downward communication with the electronic decryption microcircuit 13 embedded in the CD-ROM 1. During this communication the CD-ROM drive 2 delivers to the electronic decryption microcircuit 13 embedded in the CD-ROM 1 the encrypted data which it reads from the CD-ROM 1. The electronic decryption microcircuit 13 embedded in the CD-ROM 1 decrypts the data received with the aid of the decryption key K present in its random access memory and returns them unenciphered to the CD-ROM drive 2 which directs them to its connector for outside communication 24 so that they are utilized. Simultaneously with the establishing of any communication link with the CD-ROM drive 2, the decryption circuit 13 embedded in the CD-ROM 1 tests for the actual presence of the chip card 3 in its connector 23 and interrupts operation thereof in the event of removal of the chip card, thereby giving rise to the loss of the decryption key K by the decryption microcircuit 13 embedded in the CD-ROM 1 and preventing decryption from being continued after removal of the chip card.

The procedure for authenticating the bearer of the chip card prior to any dialogue with the latter which is performed via a request for secret code or "PIN CODE" to be typed into the keypad followed by verification of this secret code is a conventional procedure used with chip cards employed for transactions and will not be detailed here.

The secure transfer of all or part of the decryption key K into the random access memory of the decryption microcircuit 13 embedded in the CD-ROM 1 can be carried out according to the following protocol:

During a first step, the decryption microcircuit 13 embedded in the CD-ROM 1 issues an information exchange request intended for the chip card 3.

During a second step, the chip card 3, after a favorable run of the bearer identification procedure via an assent signal.

During a third step, the decryption microcircuit 13 detects the assent signal from the chip card, generates a random number A (binary random number) which it codes with an encryption/decryption key $C_1$ of an asymmetric cryptographic algorithm intended for securing transmission and dispatches to the chip card 3 in the form of an encrypted message $C_1(A)$.

During a fourth step, the chip card 3 receives this encrypted message, decrypts it with the aid of another encryption/decryption key $C_2$, in its possession, of the asymmetric cryptographic transmission algorithm used by the decryption microcircuit 13, and obtains the random number unenciphered:

$$C_2(C_1(A))=A$$

During a fifth step, the chip card 3 carries out an "exclusive or" logic operation between the random number A received from the decryption microcircuit 13 and the decryption key K for decrypting the data of the CD-ROM 1, or a missing part $K_1$ of this key which the decryption microcircuit lacks and which is known only to the chip card 3. To simplify, it is assumed here that the decryption microcircuit 13 is missing the whole of the key K so that the chip card performs the operation:

$$A \oplus K = D$$

During a sixth step, the chip card 3 codes the result of this logic operation with the transmission encryption/decryption key $C_2$ in its possession and transmits it to the decryption microcircuit 3 in the form:

$$C_2(D)=C_2(A \oplus K)$$

During a seventh step, the decryption microcircuit 13 receives this message, decrypts it with its encryption/decryption key $C_1$ and obtains the message:

$$C_1(C_2(D))=D$$

During an eighth and last step, the decryption microcircuit 13 recovers the decryption key K for decrypting the data of the CD-ROM 1 by subjecting the message received from the chip card 3 and decrypted to an "exclusive or" logic operation with the random number A which it generated at the outset:

$$D \oplus A = (A \oplus K) \oplus A = K$$

The procedure just described for transferring information from the chip card 3 towards the decryption microcircuit 13 is secure not only because the information is not transferred unenciphered but also because the encrypting of the transmission is shared between the two parties and depends on a random number which changes with each session.

Of course, the protocol just described for secure communication between the electronic decryption microcircuit 13 embedded in the CD-ROM 1 and the chip card 3, is merely one example and may be replaced by other protocol [sic] using more complex encryption algorithms such as RSA, DSA, etc.

The exchanges of information with the chip card 3 are carried out, according to the protocol defined in ISO standard 7816/4, by means of an "execute" command in the case of a transmission towards the chip card, and of a "get challenge" command in the case of a transmission originating from the chip card.

One way of verifying the presence of the chip card 3 in the chip card connector 23 of the chip card reader 2 throughout an operation for reading and decrypting the data of the CD-ROM 1 consists in periodically generating random numbers in the decryption microcircuit 13, in despatching them to the chip card 3 so as to be signed by the latter, that is to say so as to be encrypted by it with the transmission encryption/decryption key $C_2$ in its possession, and then be returned, in decrypting the signatures of the chip card 3 with the transmission encryption/decryption key $C_1$ in the possession of the electronic decryption microcircuit 13 embedded in the CD-ROM 1 and in verifying that they do indeed correspond to the random number despatched. As random numbers used during this procedure for verifying the presence of the chip card 3, the decryption microcircuit 13 embedded in the CD-ROM 1 will be able to use the result of an "exclusive or" type logic operation between the encrypted data and the decrypted data which it is currently handling.

With the system just described for the secure CD-ROM storage of data, the mere availability of the CD-ROM and of its special-purpose drive no longer makes it possible to utilize the data outside of a conventional cryptographic attack, the difficulty of which depends on the chosen encryption algorithm. This is because it lacks the key or part of the decryption key which is stored within the chip card and which is never accessible by the user unenciphered. The fact of also having the chip card is not sufficient since the identification code or "PIN CODE" must also be known in order to commence the decryption operations, whether or not the card has remained in the CD-ROM drive during a previous session.

Various complementary precautions may be taken, such as the regular changing of the chip card bearer identification code or "PIN CODE" or the restricting of the number of abortive attempts to use the chip card by virtue of a procedure for the auto-disabling of the latter. Moreover, there may be provision for a procedure for initialization during a first reading of the CD-ROM, while the latter and its data decryption key chip card have not yet been customized. With the first reading of the CD-ROM, with the chip card slotted in, the chip card requests the user to choose an identification code which it stores definitively. It then carries out a dialogue with the electronic microcircuit embedded in the CD-ROM so as to choose the keys for encrypting/decrypting their transmission link and share them amongst themselves. From this moment onwards, the secrets shared between the electronic decryption microcircuit embedded in the CD-ROM, the data decryption key chip card and the user makes it impossible for the system to operate in the absence of one of its elements and of a knowledge of the user's identification code.

The system just described is particularly beneficial for protecting sensitive data relating to the activity of a firm, stored on a CD-ROM with a view to the utilization thereof on portable personal computers by an accredited individual who is obliged to travel frequently.

Of course, the present invention is not limited to the example described but is capable of numerous variants stemming from the current practice of those skilled in the art.

What is claimed is:

1. A system for securely storing CD-ROM data, comprising:
    a CD-ROM including data encrypted at least in part with a cryptographic algorithm having a decryption key K, and including an electronic decryption microcircuit embedded in the CD-ROM;
    a CD-ROM drive for receiving the CD-ROM;
    means for exchanging information between the CD-ROM drive and the electronic decryption microcircuit embedded in the CD-ROM;
    a chip card containing at least a part $K_1$ of the decryption key K, any remaining part $K_2$ of the decryption key K being stored in the electronic decryption microcircuit embedded in the CD-ROM;
    secure means for securely exchanging information between the chip card and the electronic decryption microcircuit embedded in the CD-ROM.

2. The system according to claim 1, further comprising:
    means for authenticating an authorized user of the chip card by requesting a user to provide a secret identification code prior to an exchange of information with the chip card.

3. The system according to claim 2, wherein the chip card includes disabling means for restricting a number of abortive attempts to input the secret identification code.

4. The system according to claim 1, further comprising:
    initialization means for customizing at least one of the chip card and the secure means for exchanging information between the chip card and the electronic decryption microcircuit prior to a first use.

5. A system for securely storing CD-ROM data, comprising:
    a CD-ROM including data encrypted at least in part with a cryptographic algorithm having a decryption key K, and including an electronic decryption microcircuit embedded therein;
    a CD-ROM drive for receiving the CD-ROM;
    means for exchanging information between the CD-ROM drive and the electronic decryption microcircuit embedded in the CD-ROM;
    a chip card containing at least a part $K_1$ of the decryption key K, any remaining part $K_2$ of the decryption key K being stored in the electronic decryption microcircuit embedded in the CD-ROM;

secure means for securely exchanging information between the chip card and the electronic decryption microcircuit embedded in the CD-ROM, wherein the electronic decryption microcircuit embedded in the CD-ROM includes an antenna for providing, without the presence of contact, both an electrical power supply to the decryption microcircuit from an external source and for exchanging information with the external source.

6. A system for securely storing CD-ROM data, comprising:

a CD-ROM including data encrypted at least in part with a cryptographic algorithm having a decryption key K, and including an electronic decryption microcircuit embedded therein;

a CD-ROM drive for receiving the CD-ROM;

a chip card containing at least a part $K_1$ of the decryption key K, any remaining part $K_2$ of the decryption key K being stored in the electronic decryption microcircuit embedded in the CD-ROM;

means for exchanging information between the CD-ROM drive and the electronic decryption microcircuit embedded in the CD-ROM;

secure means for securely exchanging information between the chip card and the electronic decryption microcircuit embedded in the CD-ROM; and means for monitoring an uninterrupted presence of the chip card during an operation of the electronic decryption microcircuit embedded in the CD-ROM.

7. A system for securely storing CD-ROM data, comprising:

a CD-ROM including data encrypted at least in part with a cryptographic algorithm having a decryption key K, and including an electronic decryption microcircuit embedded therein;

a CD-ROM drive including an electronic circuit and configured to receive the CD-ROM;

a chip card containing at least a part $K_1$ of the decryption key K, any remaining part $K_2$ of the decryption key K being stored in the electronic decryption microcircuit embedded in the CD-ROM; and a secured protocol configured to securely exchange information including the part $K_1$ of the decryption key K between the chip card and the electronic microcircuit embedded in the CD-ROM, wherein the electronic decryption microcircuit embedded in the CD-ROM includes an antenna configured to provide, without the presence of contact, both an electrical power supply to the electronic decryption microcircuit from an external source and to exchange information with the external source, and wherein the electronic decryption microcircuit requests the part $K_1$ of the decryption key K from the chip card and decrypts data read from the CD-ROM with the decryption key K upon successfully receiving the part $K_1$ of the decryption key K.

8. A system for securely storing CD-ROM data, comprising:

a CD-ROM including data encrypted at least in part with a cryptographic algorithm having a decryption key K, and including an electronic decryption microcircuit embedded therein;

a CD-ROM drive configured to receive the CD-ROM;

a chip card containing at least a part $K_1$ of the decryption key K, any remaining part $K_2$ of the decryption key K being stored in the electronic decryption microcircuit embedded in the CD-ROM;

an electronic circuit included in the CD-ROM drive and configured to monitor an uninterrupted presence of the chip card during an operation of the electronic decryption microcircuit embedded in the CD-ROM; and a secured protocol configured to securely exchange information including the part $K_1$ of the decryption key K between the chip card and the electronic microcircuit embedded in the CD-ROM, wherein the electronic decryption microcircuit requests the part $K_1$ of the decryption key K from the chip card and decrypts data read from the CD-ROM with the decryption key K upon successfully receiving the part $K_1$ of the decryption key K.

9. A CD-ROM drive for securely storing CD-ROM data on a CD-ROM received therein, said CD-ROM including data encrypted at least in part with a cryptographic algorithm having a decryption key K and including an embedded electronic decryption microcircuit, and said CD-ROM drive comprising:

a chip card connector configured to receive a chip card containing at least a part $K_1$ of the decryption key K, any remaining part $K_2$ of the decryption key K being stored in the electronic decryption microcircuit embedded in the CD-ROM;

an electronic circuit configured to read the stored encrypted data from the CD-ROM;

a secured protocol configured to securely exchange information including the part $K_1$ of the decryption key K between the chip card and the electronic decryption microcircuit embedded in the CD-ROM, wherein the electronic decryption microcircuit embedded in the CD-ROM includes an antenna configured to provide, without the presence of contact, both an electrical power supply to the electronic decryption microcircuit from an external source and to exchange information with the external source, and wherein the electronic decryption microcircuit requests the part $K_1$ of the decryption key K from the chip card and decrypts data read from the CD-ROM with the decryption key K upon successfully receiving the part $K_1$ of the decryption key K.

10. A CD-ROM drive for securely storing CD-ROM data on a CD-ROM received therein, said CD-ROM including stored data encrypted at least in part with a cryptographic algorithm having a decryption key K and including an embedded electronic decryption microcircuit, and said CD-ROM drive comprising:

a chip card connector configured to receive a chip card containing at least a part $K_1$ of the decryption key K, any remaining part $K_2$ of the decryption key K being stored in the electronic decryption microcircuit embedded in the CD-ROM;

an electronic circuit configured to monitor an uninterrupted presence of the chip card during an operation of the electronic decryption microcircuit embedded in the CD-ROM; and a secured protocol configured to securely exchange information including the part $K_1$ of the decryption key K between the chip card and the electronic decryption microcircuit embedded in the CD-ROM, wherein the electronic decryption microcircuit requests the part $K_1$ of the decryption key K from the chip card and decrypts data read from the CD-ROM with the decryption key K upon successfully receiving the part $K_1$ of the decryption key K.

11. A system for securely storing CD-ROM data, comprising:

a CD-ROM including data encrypted at least in part with a cryptographic algorithm having a decryption key K, and including an electronic decryption microcircuit embedded in the CD-ROM;

a CD-ROM drive including an electronic circuit and configured to receive the CD-ROM;

a chip card containing at least a part $K_1$ of the decryption key K, any remaining part $K_2$ of the decryption key K being stored in the electronic decryption microcircuit embedded in the CD-ROM; and a secured protocol configured to securely exchange information including the part $K_1$ of the decryption key K between the chip card and the electronic microcircuit embedded in the CD-ROM, wherein the electronic decryption microcircuit requests the part $K_1$ of the decryption key K from the chip card and decrypts data read from the CD-ROM with the decryption key K upon successfully receiving the part $K_1$ of the decryption key K.

12. The system according to claim 11, further comprising:

an authenticating mechanism configured to authenticate an authorized user of the chip card by requesting a user to provide a secret identification code prior to an exchange of information with the chip card.

13. The system according to claim 12, wherein the chip card includes a disabling mechanism configured to restrict a number of abortive attempts to input the secret identification code.

14. The system according to claim 11, further comprising:

an initialization mechanism configured to customize at least one of the chip card and the secured protocol configured to exchange information between the chip card and the electronic decryption microcircuit prior to a first use.

* * * * *